United States Patent
Ooki (10) Patent No.: US 6,623,131 B2
(45) Date of Patent: Sep. 23, 2003

(54) REFLECTIVE READING OPTICAL SYSTEM

(75) Inventor: Makoto Ooki, Toyokawa (JP)

(73) Assignee: Minolta Co., Ltd, Osaka (JP)

( * ) Notice: Subject to any disclaimer, the term of this patent is extended or adjusted under 35 U.S.C. 154(b) by 0 days.

(21) Appl. No.: 10/217,546

(22) Filed: Aug. 14, 2002

(65) Prior Publication Data

US 2003/0076606 A1 Apr. 24, 2003

(30) Foreign Application Priority Data

Aug. 20, 2001 (JP) .................................. 2001-248436

(51) Int. Cl.⁷ .............................................. G02B 7/182
(52) U.S. Cl. ...................... 359/857; 359/856; 359/858; 359/861
(58) Field of Search .................... 359/857, 856, 359/858, 861, 862; 250/201.5, 204; 369/44, 45, 46

(56) References Cited

U.S. PATENT DOCUMENTS

| | | | | |
|---|---|---|---|---|
| 4,586,092 A | * | 4/1986 | Martens et al. ............... | 360/59 |
| 4,590,594 A | * | 5/1986 | Reno ....................... | 369/44.37 |
| 4,863,246 A | * | 9/1989 | Anthon ..................... | 359/487 |
| 4,983,817 A | * | 1/1991 | Dolash et al. ......... | 235/462.04 |
| 5,001,333 A | * | 3/1991 | Marshall ................. | 250/201.5 |
| 5,197,049 A | * | 3/1993 | Wehrenberg ............. | 369/13.39 |

FOREIGN PATENT DOCUMENTS

| | | |
|---|---|---|
| JP | 11-023971 | 1/1999 |
| JP | 2000-275557 | 10/2000 |

* cited by examiner

*Primary Examiner*—Mohammad Sikder
(74) *Attorney, Agent, or Firm*—Morrison & Foerster LLP (57) ABSTRACT

A reading optical system that forms the image of the original document on a one-dimensional imaging element, such system comprising multiple reflective surfaces only, wherein at least one of such surfaces is a free-form surface that has a symmetrical surface relative to the main scanning direction and no symmetrical surface relative to the sub scanning direction. Where the light beam that passes through the center of the original document and the center of the aperture is deemed the axial main light beam, the path of the axial main light beam that strikes the first reflective surface extends along the Z-axis, the length of the one-dimensional imaging element extends along the Y-axis, and the X-axis extends perpendicular to the Y-axis and the Z-axis, each reflective surface is arranged such that it is tilted relative to the Y-axis.

5 Claims, 6 Drawing Sheets

REFLECTIVE READING OPTICAL SYSTEM

The present application claims priority to Japanese Patent Application No. 2001-248436 filed Aug. 20, 2001, the entire content of which is hereby incorporated by reference.

BACKGROUND OF THE INVENTION

1. Field of the Invention

The present invention relates to a reflective reading optical system, and more particularly, to a reflective reading optical system suitable for an image reading apparatus (particularly a digital copying machine, a facsimile or a scanner) equipped with a one-dimensional imaging element such as a line CCD (charge coupled device), for example.

2. Description of the Related Art

The optical surfaces having a focal power in the multi-beam type scanning optical system proposed by Japanese Laid-Open Patent Application 2000-275557 all consist of reflective surfaces. In this construction, the increase in the width of the beam along the image height due to positional offsetting for each beam is eliminated via the reflective surfaces. An imaging optical system using reflective surfaces is also known. For example, Japanese Laid-Open Patent Application H11-23971 proposes a device that includes both reflective and transmitting surfaces. However, because the device disclosed in this laid-open patent application is used in order to obtain two-dimensional images, correction of distortion is not adequate. By contrast, adequate distortion correction is possible in a reading optical system used to obtain one-dimensional images, and a device using reflective surfaces is also known.

However, because a light source having a wide wavelength range is used in an image reading apparatus, if a transmitting surface having a focal power is included in the reading optical system, a reduction in contrast caused by color aberration is unavoidable. In addition, if multiple reflective surfaces are to be used in a reading optical system, the reflective surfaces must be decentered, and as a result of non-symmetricity of light beam positions in the decenter cross-section, the problem arises that aberration correction becomes difficult.

SUMMARY OF THE INVENTION

A main object of the present invention is to provide a reflective reading optical system by which high contrast is obtained even if the light source has a wide wavelength range, and by which aberrations are well-corrected even where the reflective surfaces are decentered.

In order to attain the above object, the reflective reading optical system of the present invention is a reflective reading optical system that forms the image of the original document on an one-dimensional imaging element, such optical system having as optical surfaces with a focal power multiple reflective surfaces only, wherein at least one of such surfaces is a free-form surface that has a symmetrical surface relative to the main scanning direction and has no symmetrical surface relative to the sub scanning direction, and wherein each reflective surface is arranged such that they are tilted relative to the Y-axis.

Here, the Z-axis extends along the incident light beam, which is the axial main light beam that passes through the center of the original document and the center of the aperture and strikes the first reflective surface. The Y-axis extends along the length of the one-dimensional imaging element. The X-axis extends perpendicular to the Y-axis and the Z-axis.

It is also acceptable if an aperture exists between the first reflective surface and the last reflective surface struck by the axial main light beam.

It is also acceptable if the aperture is constructed integrally with a reflective surface.

It is also acceptable if, when the length of the aperture extending in the main scanning direction is SY and the length thereof extending in the sub scanning direction is SX, the relationship expressed by the condition SY>SX is satisfied.

It is also acceptable if the path of the axial main light beam that first strikes the reflective surface and the path of the axial main light beam that strikes the imaging element are essentially perpendicular to each other on the X-Z cross-section.

The invention itself, together with further objects and attendant advantages, will best be understood by reference to the following detailed description taken in conjunction with the accompanying drawings.

BRIEF DESCRIPTION OF THE DRAWINGS

In the following description, like parts are designated by like reference numbers throughout the several drawings.

DETAILED DESCRIPTION OF THE PREFERRED EMBODIMENTS

Figure 1:
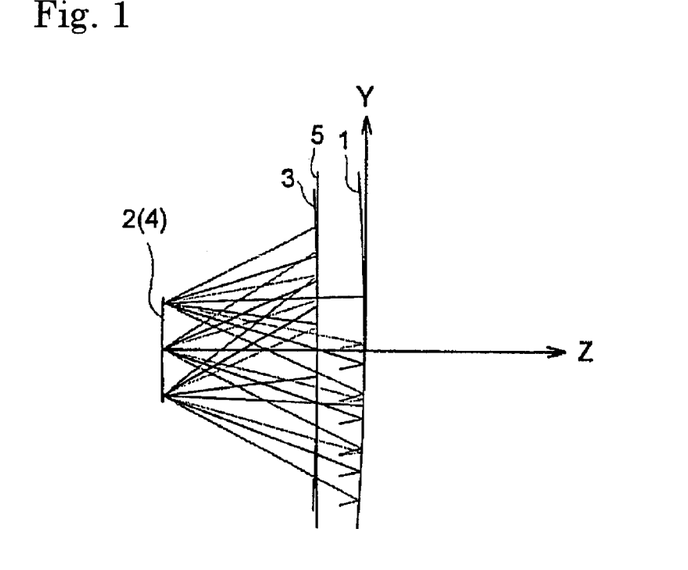
FIG. 1 is a Y-Z cross-sectional view showing a first embodiment (example 1) of the reading optical system of the present invention.
Figure 2:
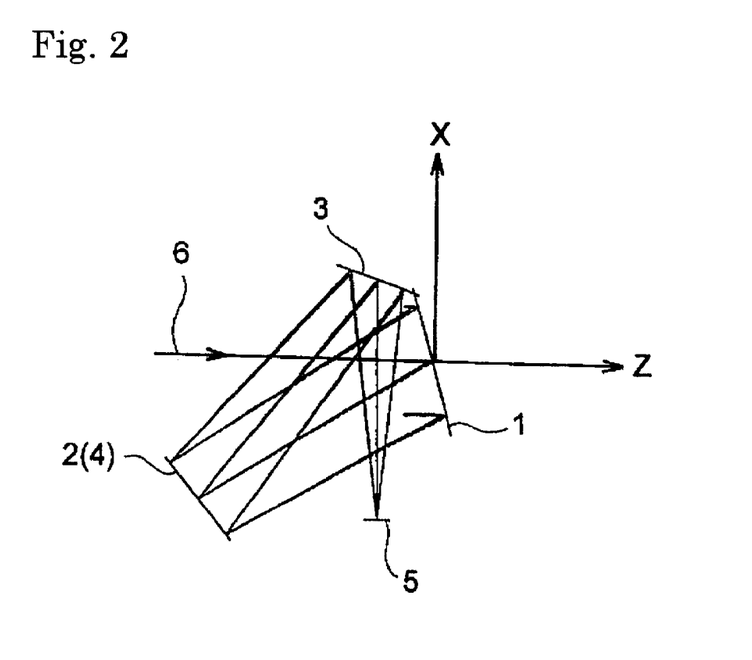
FIG. 2 is a X-Z cross-sectional view showing the first embodiment (example 1) of the reading optical system of the present invention.
Figure 3:
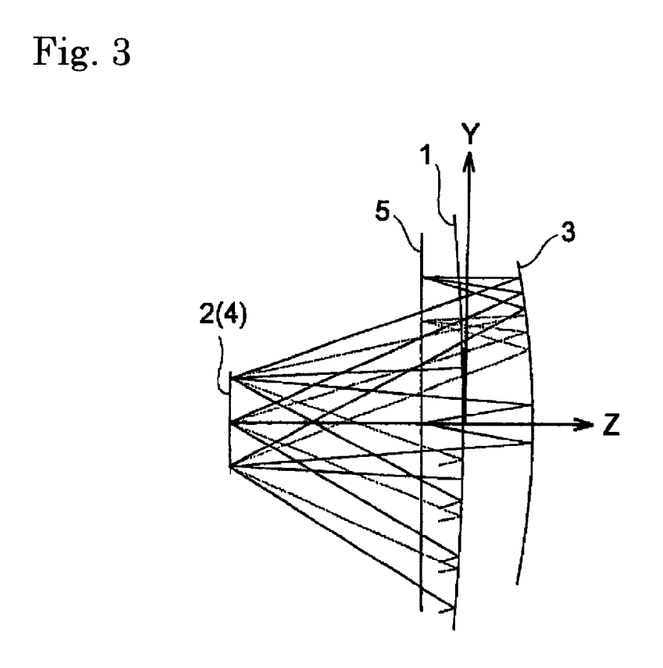
FIG. 3 is a Y-Z cross-sectional view showing a second embodiment (example 2) of the reading optical system of the present invention.
Figure 4:
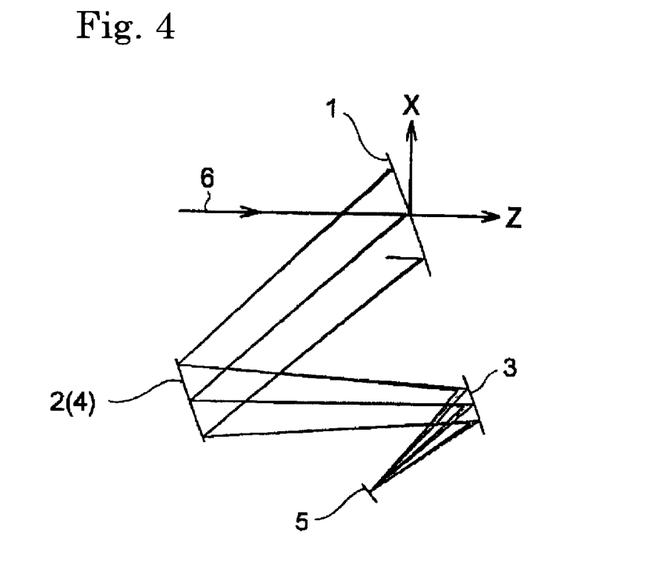
FIG. 4 is a X-Z cross-sectional view showing the second embodiment (example 2) of the reading optical system of the present invention.
Figure 5:
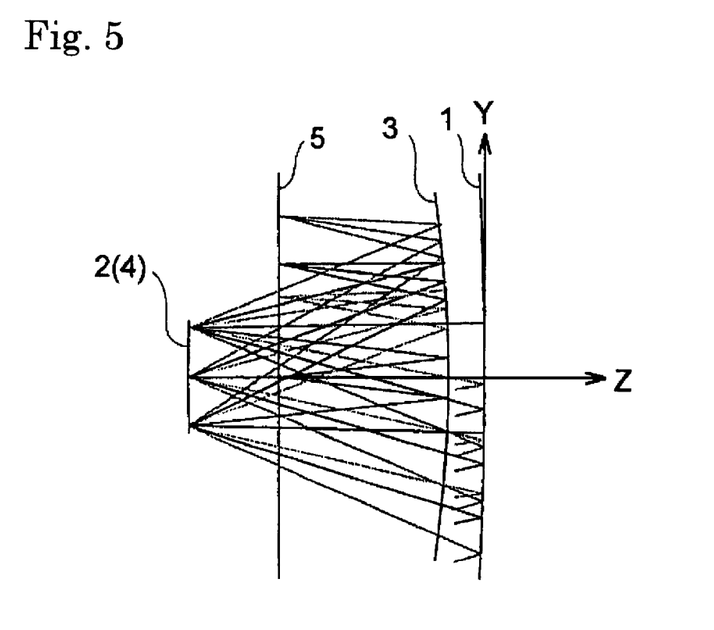
FIG. 5 is a Y-Z cross-sectional view showing a third embodiment (example 3) of the reading optical system of the present invention.
Figure 6:
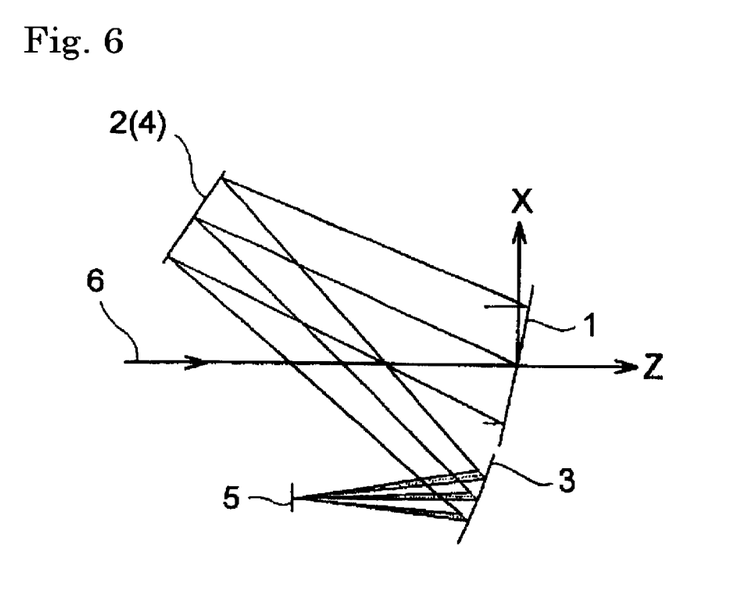
FIG. 6 is a X-Z cross-sectional view showing the third embodiment (example 3) of the reading optical system of the present invention.

The reflective reading optical system in which the present invention is implemented is described below with reference to the drawings. FIG. 1, FIGS. 2 and 3, FIGS. 4 and 5 and FIG. 6 show the optical constructions and light paths of the first, second and third embodiments, respectively, using optical cross-sectional views. In each drawing, 1 is a first reflective surface, 2 is a second reflective surface, 3 is a third reflective surface, 4 is an aperture, 5 is an imaging element, and 6 is an axial main light beam. In a Cartesian coordinate system (X, Y, Z) that has the surface apex of the first reflective surface (1) as the origin (0, 0, 0), FIGS. 1, 3 and 5 show the Y-Z cross-section, while FIGS. 2, 4 and 6 show the X-Z cross-section.

In each embodiment, the reading optical system comprises first through third reflective surfaces (1), (2) and (3) only, such that the image of the original document is formed on the one-dimensional imaging element (5). Each of the first through third reflective surfaces (1), (2) and (3) is a free-form surface having a symmetrical surface relative to the main scanning direction, and has no symmetrical surface relative to the sub scanning direction. Here, the main scanning direction is the one-dimensional alignment direction of the imaging element (5) (i.e., the direction in which the light receiving elements comprising pixels are aligned), and the sub scanning direction is the direction that is perpendicular to the main scanning direction and the plane-normal direction. In addition, when the light beam that passes through the center of the original document and the center of the aperture (4) is the axial main light beam (6), the Z-axis extends along the path of the axial main light beam (6) that strikes the first reflective surface (1), the Y-axis extends along the length of the one-dimensional imaging element (5), and the X-axis extends perpendicular to the Y-axis and the Z-axis, the reflective surfaces (1), (2) and (3) are positioned tilted relative to the Y-axis.

In the construction in which multiple reflective surfaces only are used as the optical surfaces having a focal power, no color aberration occurs because no transmitting surfaces having a focal power are included, as in the embodiments. Therefore, even where the light source used has a wide wavelength range, high contrast can be obtained. Furthermore, because the absence of color aberration results in fewer aberrations to control than in the conventional art, it becomes possible to construct the reading optical system using fewer surfaces than in the conventional art. As a result, cost reduction can be attained.

Moreover, by using a free-form surface that has a symmetrical surface relative to the main scanning direction and no symmetrical surface relative to the sub scanning direction for at least one of the multiple reflective surfaces, aberration correction can be performed for the main scanning direction independent from the sub scanning direction, and vice versa. In each embodiment, the first through third reflective surfaces (1), (2) and (3) are arranged such that they are tilted relative to the Y-axis. When multiple reflective surfaces are decentered in the X-Z cross-section and the light beam positions are non-symmetrical in the decenter cross-section (X-Z cross-section) in this way, good aberration correction can be obtained by using the above-mentioned characteristic free-form surface. Therefore, using the reading optical system of each embodiment in an image reading apparatus (such as a digital copying machine, a facsimile or a scanner), the image reading apparatus can be made compact in size, while the cost is reduced and performance is increased.

In each embodiment, the aperture (4) is integrally formed with the second reflective surface (2), and the size and shape of the aperture (4) are determined within the scope of the coating of the reflective film that comprises the second reflective surface (2). It is preferred that an aperture (4) exist between the first reflective surface (1), which the axial main light beam (6) strikes first, and the last reflective surface (the third reflective surface (3) in each embodiment), which the axial main light beam (6) strikes last, as described above. It is further preferred that the aperture (4) be integrally formed with a reflective surface. Because each reflective surface (1) through (3) increases in size as its distance from the aperture (4) increases, if the aperture (4) is integrally formed with the second reflective surface (2), the second reflective surface (2) as well as the first and third reflective surfaces (1) and (3) can be made smaller. As a result, the entire reading optical system can be made compact. In addition, where the length of the aperture (4) that extends in the main scanning direction is SY and the length thereof that extends in the sub scanning direction is SX, it is preferred that the relationship expressed by the condition SY>SX be met. Unless this relationship is met, each reflective surface (1), (2) and (3) increases in size in the second scanning direction, resulting in a larger reading optical system as a whole.

It is preferred that the path of the axial main light beam (6) that strikes the first reflective surface (1) and the path of the axial main light beam (6) that strikes the imaging element (5) run essentially perpendicular to each other on the X-Z cross-section, as in the first embodiment shown in FIG. 2. Because the path of the axial main light beam (6) that strikes the first reflective surface (1) extends along the Z-axis, the axial main light beam (6) that strikes the imaging element (5) should extend essentially along the X-axis. By having such a light path arrangement, the entire reading optical system can be made compact (particularly along the X-axis).

Figure 7:
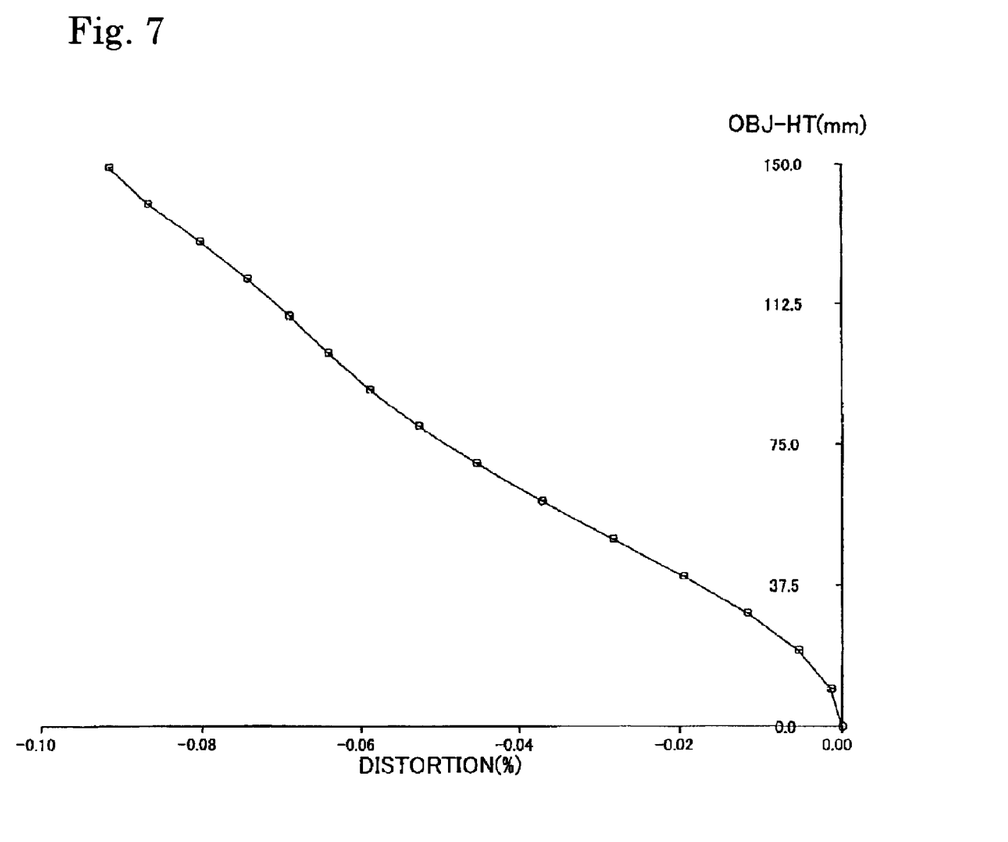
FIG. 7 is a distortion chart for the first embodiment.
Figure 8:
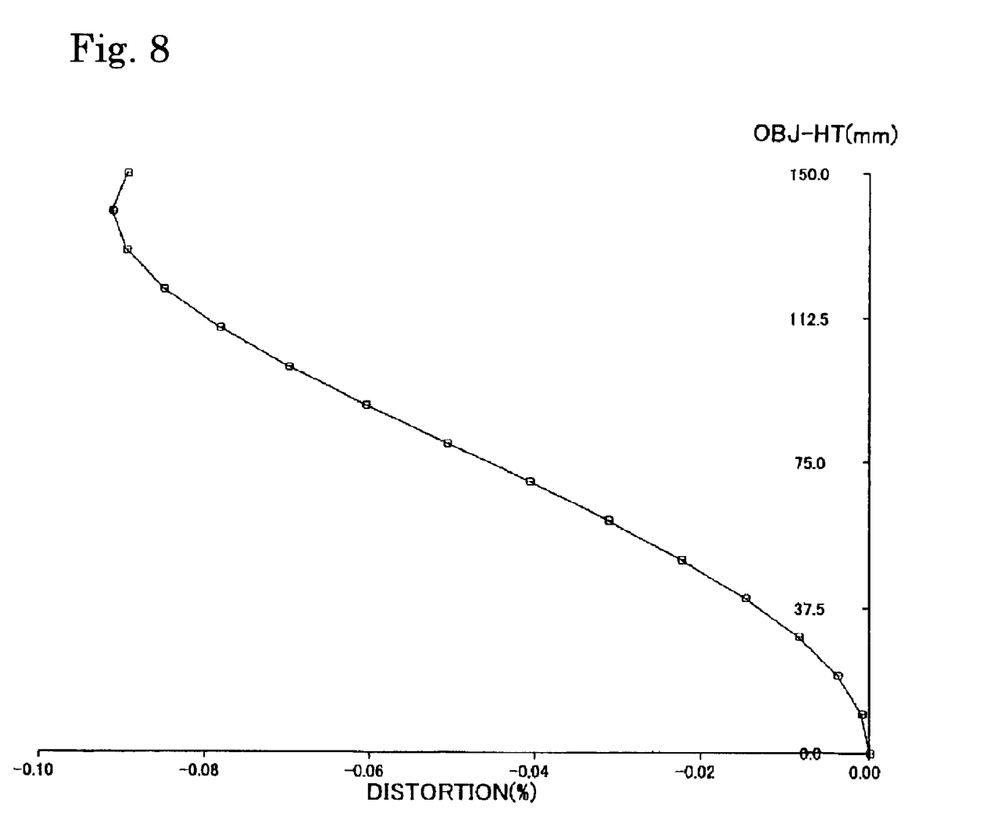
FIG. 8 is a distortion chart for the second embodiment.
Figure 9:
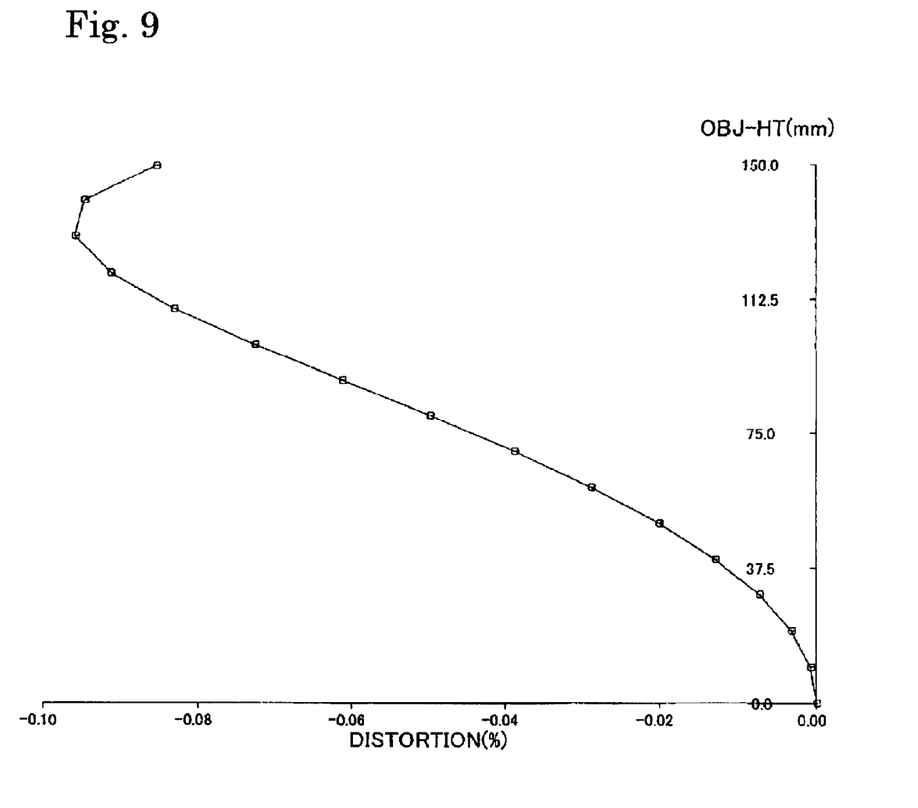
FIG. 9 is a distortion chart for the third embodiment.

Reflective reading optical systems in which the present invention is implemented are more specifically described below with reference to construction data and the like. The examples 1 through 3 referred to here respectively correspond to the first through third embodiments described above. The light paths and optical constructions of the examples 1 through 3 are as shown in the optical cross-sectional views for the corresponding embodiments, respectively (FIG. 1, FIGS. 2 and 3, FIGS. 4 and 5, FIG. 6). Table 1 shows the construction data for the examples 1 through 3, and Table 2 shows the shape and size, i.e., the lengths (SX) and (SY), of the aperture (4) used in the examples 1 through 3, respectively. The surface configurations of the first through third reflective surfaces (1), (2) and (3) are shown as free-form surface data (free-form surfaces 1 through 3), and the arrangements of the first through third reflective surfaces (1), (2) and (3) and the image surface (5) are shown as coordinate data (decrntering 1 through 4). Furthermore, FIGS. 7 through 9 show the distortion for the examples 1 through 3, respectively. In the distortion charts, the horizontal axis represents the distortion (DISTORTION, %), and the vertical axis represents the object height (OBJ-HT, mm).

The first through third reflective surfaces (1), (2) and (3) are free-form surfaces that each have a symmetrical surface relative to the main scanning direction and no symmetrical surface relative to the sub scanning direction. The shape of each reflective surface is expressed by the following formula (FS) that expresses the displacement amount (sag) along the Z-axis from the X-Y plane. The free-form surface data for each reflective surface (1), (2) and (3) comprises the constants in the formula (FS). Where all of the constants for odd-number Y terms are made 0, the surface can have a symmetrical surface relative to the main scanning direction (along the Y-axis).

$$(FS): Z = C2X + C3Y + C4X^2 + C5XY + C6Y^2 + C7X^3 + C8X^2Y + C9XY^2 + C10Y^3 + C11X^4 + C12X^3Y + C13X^2Y^2 + C14XY^3 + C15Y^4 + C16X^5 + C17X^4Y + C18X^3Y^2 + C19X^2Y^3 + C20XY^4 + C21Y^5 + C22X^6 + C23X^5Y + C24X^4Y^2 + C25X^3Y^3 + C26X^2Y^4 + C27XY^5 + C28Y^6 + \ldots + C35XY^6 + \ldots + C45Y^8 + \ldots + C66Y^{10}$$

The arrangements of the optical surfaces (1) through (5) are specified by the position and tilt of the surface. The position of each surface (1) through (5) is expressed by the coordinates (XDE, YDE, ZDE) of the point (surface apex) at which the surface crosses the axial main light beam (6) in the Cartesian coordinate system (X, Y, Z) that has the surface apex of the first reflective surface (1) as its origin (0, 0, 0) (unit of measurement: mm). The tilt of each surface (1) through (5) is expressed by the tilt amount (ADE, BDE, CDE) relative to the X-axis, the Y-axis and the Z-axis with the X-Y plane as the reference and the point that the surface crosses with the axial main light beam (6) as the center (unit of measurement: °). The coordinate data that expresses the arrangement of each surface comprises the surface apex coordinates (XDE, YDE, ZDE) and the tilt amount (ADE, BDE, CDE).

TABLE 1 examples 1 through 3

| surface | surface configuration | surface distance | arrangement |
|---|---|---|---|
| object surface (original document surface) | radius of curvature = ∞ | | |
| reflective surface 1 | free-form surfaces 1 | 450 mm | decentering 1 |
| reflective surface 2 (4) | free-form surfaces 2 | — | decentering 2 |
| reflective surface 3 | free-form surfaces 3 | — | decentering 3 |
| image surface (5) | radius of curvature = ∞ | — | decentering 4 |

TABLE 2

| | | size of aperture (mm) | |
|---|---|---|---|
| | shape of aperture | SX | SY |
| example 1 | rectangle | 4.8 | 5.5 |
| example 2 | rectangle | 4.5 | 5.0 |
| example 3 | oval | 4.7 | 5.2 |

Free-Form Surface Data of Example 1
[Free-Form Surface 1]
$C4=-1.8800\times10^{-3}$, $C6=-2.0075\times10^{-3}$, $C7=5.0822\times10^{-6}$, $C9=2.2652\times10^{-6}$, $C13=-1.7967\times10^{-8}$, $C15=2.8716\times10^{-7}$, $C18=-6.5560\times10^{-9}$, $C20=-6.7910\times10^{-9}$, $C26=1.2564\times10^{-10}$, $C28=-5.2480\times10^{-11}$, $C35=1.7660\times10^{-12}$

[Free-Form Surface 2]
$C4=1.7970\times10^{-3}$, $C6=1.9513\times10^{-3}$, $C7=1.1758\times10^{-5}$, $C9=-1.3496\times10^{-5}$, $C13=-1.0000\times10^{-6}$, $C15=2.6659\times10^{-7}$, $C18=-3.8217\times10^{-8}$, $C20=-3.5279\times10^{-8}$, $C26=-1.7119\times10^{-9}$, $C28=1.0014\times10^{-8}$, $C35=5.0394\times10^{-10}$, $C45=-2.1355\times10^{-10}$

[Free-Form Surface 3]
$C4=-3.7729\times10^{-3}$, $C6=-3.9980\times10^{-3}$, $C7=4.5181\times10^{-5}$, $C9=-5.7685\times10^{-5}$, $C13=-4.5244\times10^{-6}$, $C15=6.8451\times10^{-7}$, $C20=8.1490\times10^{-9}$, $C26=1.0567\times10^{-9}$, $C28=1.3911\times10^{-9}$, $C35=4.5520\times10^{-12}$, $C45=-8.8066\times10^{-12}$, $C66=1.8875\times10^{-14}$ Coordinate data of example 1

[Decentering 1]

(XDE, YDE, ZDE) = (0, 0, 0)
(ADE, BDE, CDE) = (0, −15, 0)
[Decentering 2]

(XDE, YDE, ZDE) = (−14.500, 0, −25.115)
(ADE, BDE, CDE) = (0, −40, 0)
[Decentering 3]

(XDE, YDE, ZDE) = (8.481, 0, −5.831)
(ADE, BDE, CDE) = (0, −70, 0)

-continued

[Decentering 4]

(XDE, YDE, ZDE) = (−16.519, 0, −5.831)
(ADE, BDE, CDE) = (0, −90, 0)

Free-Form Surface Data of Example 2
[Free-Form Surface 1]
$C4=-1.8911\times10^{-3}$, $C6=-2.1536\times10^{-3}$, $C7=-2.7027\times10^{-6}$, $C9=2.1214\times10^{-5}$, $C13=-2.0636\times10^{-7}$, $C15=1.6858\times10^{-7}$, $C18=2.3722\times10^{-9}$, $C20=-1.5820\times10^{-9}$, $C26=-6.1970\times10^{-12}$, $C28=-1.3454\times10^{-11}$

[Free-Form Surface 2]
$C4=2.0566\times10^{-3}$, $C6=2.3899\times10^{-3}$, $C7=-1.3425\times10^{-5}$, $C9=1.1730\times10^{-5}$, $C13=-1.1533\times10^{-6}$, $C15=6.5814\times10^{-8}$, $C18=8.4242\times10^{-9}$, $C20=-1.5402\times10^{-8}$

[Free-Form Surface 3]
$C4=-5.3814\times10^{-3}$, $C6=-5.6662\times10^{-3}$, $C7=1.1956\times10^{-4}$, $C9=-1.2903\times10^{-4}$, $C13=-1.0131\times10^{-5}$, $C15=5.8077\times10^{-7}$, $C18=4.7498\times10^{-8}$, $C20=8.3163\times10^{-9}$, $C26=-1.1219\times10^{-9}$, $C28=2.2302\times10^{-10}$ Coordinate data of example 2

[Decentering 1]

(XDE, YDE, ZDE) = (0, 0, 0)
(ADE, BDE, CDE) = (0, −20, 0)
[Decentering 2]

(XDE, YDE, ZDE) = (−22.675, 0, −27.023)
(ADE, BDE, CDE) = (0, −20, 0)
[Decentering 3]

(XDE, YDE, ZDE) = (−22.675, 0, 8.029)
(ADE, BDE, CDE) = (0, −20, 0)
[Decentering 4]

(XDE, YDE, ZDE) = (−33.421, 0, −4.778)
(ADE, BDE, CDE) = (0, −40, 0)

Free-Form Surface Data of Example 3
[Free-Form Surface 1]
$C4=-1.8080\times10^{-3}$, $C6=-1.3365\times10^{-3}$, $C7=-6.2144\times10^{-6}$, $C9=-1.1576\times10^{-5}$, $C13=-1.1253\times10^{-7}$, $C15=2.0092\times10^{-7}$, $C18=9.7911\times10^{-1}$, $C20=2.6654\times10^{-9}$, $C26=9.1111\times10^{-12}$, $C28=-1.1949\times10^{-11}$

[Free-Form Surface 2]
$C4=1.9879\times10^{-3}$, $C6=3.0469\times10^{-3}$, $C7=6.9051\times10^{-6}$, $C9=-3.7952\times10^{-5}$, $C11=-1.9945\times10^{-7}$, $C13=-6.4193\times10^{-7}$, $C15=1.8502\times10^{-7}$, $C18=5.7722\times10^{-9}$, $C20=1.2189\times10^{-8}$

[Free-form surface 3]
$C4=-5.1014\times10^{-3}$, $C6=-4.4448\times10^{-3}$, $C7=3.0126\times10^{-4}$, $C9=-1.3255\times10^{-4}$, $C13=-9.0174\times10^{-6}$, $C15=1.0060\times10^{-6}$, $C18=-1.7298\times10^{-7}$, $C20=9.6014\times10^{-9}$, $C26=1.9153\times10^{-9}$, $C28=1.3052\times10^{-11}$, $C45=4.9348\times10^{-13}$ Coordinate data of example 3

[Decentering 1]

(XDE, YDE, ZDE) = (0, 0, 0)
(ADE, BDE, CDE) = (0, 12, 0)
[Decentering 2]

(XDE, YDE, ZDE) = (14.236, 0, −31.974)
(ADE, BDE, CDE) = (0, 34, 0)

-continued

[Decentering 3]

(XDE, YDE, ZDE) = (−12.856, 0, −3.920)
(ADE, BDE, CDE) = (0, 22, 0)
[Decentering 4]

(XDE, YDE, ZDE) = (−12.856, 0, −22.168)
(ADE, BDE, CDE) = (0, 0, 0)

As described above, using the reading optical system of the present invention, because no transmitting surfaces are included as optical surfaces having a focal power, even if the light source used has a wide wavelength range, high contrast can be obtained. Moreover, because characteristic free-form surfaces are used, even if the reflective surfaces are decentered, good aberration correction can be realized. Where the reading optical system of the present invention is used in an image reading apparatus such as a digital copying machine, a facsimile or a scanner, the image reading apparatus can be made compact, and offer low cost and good performance.

Although the present invention has been fully described by way of examples with reference to the accompanying drawings, it is to be noted that various changes and modifications will be apparent to those skilled in the art. Therefore, unless such changes and modification depart from the scope of the present invention, they should be construed as being included therein.

What is claimed is:

1. An reading optical system that forms an image of an original document on an one-dimensional imaging element, comprising:

multiple reflective surfaces only as optical surfaces with a focal power, wherein at least one of the reflective surfaces is a free-form surface which has a symmetrical surface relative to a main scanning direction and has no symmetrical surface relative to a sub scanning direction, and wherein each reflective surface is arranged such that they are tilted relative to Y-axis, wherein Z-axis extends along an incident light beam, which is the axial main light beam that passes through a center of the original document and a center of an aperture and strikes a first reflective surface, the Y-axis extends along length of the one-dimensional imaging element, and X-axis extends perpendicular to the Y-axis and the Z-axis.

2. The reading optical system an claimed in claim 1, further comprising:

an aperture which exists between the first reflective surface and a last reflective surface struck by the axial main light beam.

3. The reading optical system an claimed in claim 2, wherein the aperture is constructed integrally with the reflective surface.

4. The reading optical system an claimed in claim 2, wherein a relationship expressed by a condition SY>SX is satisfied, wherein SY is length of the aperture extending in the main scanning direction, and SX is length thereof extending in the sub scanning direction.

5. The reading optical system an claimed in claim 1, wherein a path of the axial main light beam that first strikes the reflective surface and a path of the axial main light beam that strikes the imaging element are essentially perpendicular to each other on X-Z cross-section.

* * * * *

UNITED STATES PATENT AND TRADEMARK OFFICE
CERTIFICATE OF CORRECTION

PATENT NO. : 6,623,131 B2
DATED : September 23, 2003
INVENTOR(S) : Makoto Ooki

It is certified that error appears in the above-identified patent and that said Letters Patent is hereby corrected as shown below:

Column 8,
Lines 14, 19, 22 and 28, change "an" to -- as --.

Signed and Sealed this

Twenty-fourth Day of February, 2004

JON W. DUDAS
*Acting Director of the United States Patent and Trademark Office*